(12) United States Patent
Hamed et al.

(10) Patent No.: US 10,065,856 B2
(45) Date of Patent: Sep. 4, 2018

(54) METHOD OF STORING A GAS, IN PARTICULAR HYDROGEN

(71) Applicants: Enass Abo Hamed, Cambridgeshire (GB); Oren Scherman, Cambridgeshire (GB); Eric Andrew Appel, Los Alamitos, CA (US)

(72) Inventors: Enass Abo Hamed, Cambridgeshire (GB); Oren Scherman, Cambridgeshire (GB); Eric Andrew Appel, Los Alamitos, CA (US)

( * ) Notice: Subject to any disclaimer, the term of this patent is extended or adjusted under 35 U.S.C. 154(b) by 20 days.

(21) Appl. No.: 15/129,563

(22) PCT Filed: Mar. 31, 2015

(86) PCT No.: PCT/GB2015/050980
§ 371 (c)(1),
(2) Date: Sep. 27, 2016

(87) PCT Pub. No.: WO2015/150777
PCT Pub. Date: Oct. 8, 2015

(65) Prior Publication Data
US 2017/0137283 A1    May 18, 2017

(30) Foreign Application Priority Data

Mar. 31, 2014 (GB) .................................. 1405715.2

(51) Int. Cl.
*B01J 23/46* (2006.01)
*B01J 31/02* (2006.01)
(Continued)

(52) U.S. Cl.
CPC ............. *C01B 3/04* (2013.01); *B01J 23/462* (2013.01); *B01J 31/0237* (2013.01); *B01J 31/06* (2013.01);
(Continued)

(58) Field of Classification Search
None
See application file for complete search history.

(56) References Cited

U.S. PATENT DOCUMENTS

| 4,433,063 A | 2/1984 | Bernstein et al. |
| 7,595,108 B2 | 9/2009 | Perez et al. |
| 2013/0216472 A1 | 8/2013 | Han et al. |

OTHER PUBLICATIONS

Akbayrak et al., "Ruthenium(0) nanoparticles supported on nanotitania as highly active and reusable catalyst in hydrogen generation from the hydrolysis of ammonia borane," International Journal of Hydrogen Energy, vol. 39, 2014, pp. 9628-9637.

(Continued)

*Primary Examiner* — Colin W. Slifka
(74) *Attorney, Agent, or Firm* — Kilyk & Bowersox, P.L.L.C.

(57) ABSTRACT

We describe a method of storing a gas, in particular hydrogen, comprising: providing a polymer sponge, wherein said polymer sponge comprises a plurality of catalytic nanoparticles; providing a solution of reactants, catalyzed by said nanoparticles to produce said gas; absorbing said solution into said polymer sponge such that said reactants react within said polymer sponge to produce said gas; wherein said gas is held within said polymer sponge; and wherein said polymer sponge comprises a thermally responsive polymer having a volume which reduces with a change in temperature, such that said gas held within said polymer is extractable by changing a temperature of said polymer sponge.

15 Claims, 10 Drawing Sheets

(51) Int. Cl.
*B01J 31/06* (2006.01)
*B01J 35/00* (2006.01)
*B01J 35/04* (2006.01)
*B01J 37/00* (2006.01)
*B01J 37/04* (2006.01)
*B01J 37/16* (2006.01)
*B01J 37/34* (2006.01)
*C01B 3/00* (2006.01)
*C01B 3/04* (2006.01)

(52) U.S. Cl.
CPC ....... *B01J 35/0006* (2013.01); *B01J 35/0013* (2013.01); *B01J 35/04* (2013.01); *B01J 37/009* (2013.01); *B01J 37/04* (2013.01); *B01J 37/16* (2013.01); *B01J 37/343* (2013.01); *C01B 3/0078* (2013.01); *C01B 3/0084* (2013.01)

(56) References Cited

OTHER PUBLICATIONS

Fernandes et al., "Ruthenium nanoparticles supported over carbon thin film catalyst synthesized by pulsed laser deposition for hydrogen production from ammonia borane," Applied Catalysis A: General, vol. 495, 2015, pp. 23-29.

International Search Report and Written Opinion issued in corresponding International Patent Application No. PCT/GB2015/050980 dated Dec. 8, 2015 (25 pages).

Attia et al., "Nanoporous polypyrrole: preparation and hydrogen storage properties," International Journal of Energy Research, vol. 38, No. 4, 2013, pp. 466-476.

Can et al., "A facile synthesis of nearly monodisperse ruthenium nanoparticles and their catalysis in the hydrolytic dehydrogenation of ammonia borane for chemical hydrogen storage," Applied Catalysis B: Environmental, vol. 125, 2012, pp. 304-310.

Hong et al., "Palladium Nanoparicles on Thermoresponsive Hydrogels and their Application as Recyclable Suzuki-Miyaura Coupling Reaction Catalysts in Water," Advanced Synthesis & Catalysis, vol. 354, No. 7, 2012, pp. 1257-1263.

Swinnen et al., "Hydrogen release from ammonia borane and derivatives in the presence of a ruthenium complex incorporating cooperative PNP ligands," Chemical Physics Letters, vol. 513, 2011, pp. 195-200.

Zahmakiran, M., "Preparation and characterization of LTA-type zeolite framework dispersed ruthenium nanoparticles and their catalytic application in the hydrolytic dehydrogenation of ammonia-borane for efficient hydrogen generation," Materials Science and Engineering B, vol. 177, 2012, pp. 606-613.

METHOD OF STORING A GAS, IN PARTICULAR HYDROGEN

This application is a National Stage Application of PCT/GB2015/050980, filed Mar. 31, 2015, which claims priority to United Kingdom Patent Application No. 1405715.2, filed Mar. 31, 2014, which are incorporated in their entireties by reference herein.

FIELD OF THE INVENTION

This invention relates to a method of storing gas, in particular hydrogen, to a method of recovering the stored gas, to a related gas storage device, to a method of manufacturing a polymer sponge for storing gas, to a further method of producing gas, in particular hydrogen, using catalytic nanoparticles, to a method of catalysing a reaction, and to a metal nanoparticle catalyst.

BACKGROUND TO THE INVENTION

There is a recognised difficulty in storing gas, in particular hydrogen, as an alternative energy source. We describe techniques which address this problem. Related work has identified that metal nanoparticles form in hither to unrecognised ways, which in turn has led to the recognition that there are new ways of catalysing a reaction and that new techniques can be used to provide a metal nanoparticle catalyst. Furthermore these approaches are general and not restricted, for example, to the production of hydrogen.

General background prior art can be found in "Palladium Nanoparticles on Thermoresponsive Hydrogels and their Application as Recyclable Suzuki-Miyaura Coupling Reaction Catalysts in Water", Myeng Chan Hong et al., in Adv. Synth. Catal. 2012, 354, 1257-1263.

SUMMARY OF THE INVENTION

According to the present invention there is therefore provided a method of storing a gas, in particular hydrogen, comprising: providing a polymer sponge, wherein said polymer sponge comprises a plurality of catalytic nanoparticles; providing a solution of reactants, catalysed by said nanoparticles to produce said gas; absorbing said solution into said polymer sponge such that said reactants react within said polymer sponge to produce said gas; wherein said gas is held within said polymer sponge; and wherein said polymer sponge comprises a thermally responsive polymer having a volume which reduces with a change in temperature, such that said gas held within said polymer is extractable by changing a temperature of said polymer sponge.

In some preferred embodiments of the method the catalytic nanoparticles comprise complexes of a nanoparticle with a stabilising molecule, in embodiments based on a macrocyclic molecule such as cucurbit[n]uril. These molecules associate with the nanoparticles in dynamic assemblies and provide a steric effect restricting nanoparticles from agglomerating with one another. In broad terms these molecules merely need to be relatively large and bulky to have this effect, for example having a maximum dimension greater than 0.5 nm. (In later embodiments we describe the stabilising molecule as performing the function of the guest in a guest-host reaction, and in these cases the host may be the molecule which provides the steric hindrance—for example a molecule with a maximum dimension greater than 0.5 nm, for example a macrocycle such as cucurbil[n]uril).

In embodiments the nanoparticle comprises or consists essentially of metal nanoparticles. In some particular embodiments we describe the nanoparticles comprise ruthenium nanoparticles but many other types of metal may also be employed including, but not limited to, palladium, platinum, copper, iron and the like.

In embodiments of the method the thermally responsive polymer has a volume which reduces above a threshold temperature to provide the gas. One preferred example of such a polymer is polyNIPAM [poly(N-isopropyl acrylamide)]. However, the skilled person will be aware of other temperature-responsive polymers which may alternately be employed—the particular polymer is not important, it is the change in volume of the polymer when crossing a temperature threshold which matters. In embodiments the threshold temperature is a lower critical solvation temperature of the polymer (also referred to as the lower critical solution temperature). In general a preferred class of thermally responsive polymers undergoes a coil-globule transition at a transition temperature, which results in a change in volume of the polymer at that temperature. Preferably the polymer is compatible with the use of water as a solvent for the reaction (producing the hydrogen), and thus further examples of suitable polymers include hydroxypropylcellulose, poly(vinylcaprolactame), polyvinyl methyl ether, and others such as examples listed in the review, 'Non-ionic thermoresponsive polymers in water', V. Aseyev et al, Advances in Polymer Science, 2010, Vol. 242, pages 29-89.

Whichever polymer is chosen, in preferred embodiments of the method the polymer sponge is produced by polymerising one or more appropriate monomers in the presence of the catalytic (metal) nanoparticles.

Use of a polymer which is compatible with an aqueous solution is advantageous because the reactants catalysed by the nanoparticles may then comprise a solution of metal hydride, which provides a convenient and practical source of hydrogen. Again the skilled person will be aware of many potential reactants which may be employed to produce the gas stored in the sponge, more particularly the stored hydrogen. In broad terms, in some preferred classes of the method the reaction within the sponge comprises a reaction of a hydrogen-containing compound with water, the polymer sponge storing the hydrogen produced. One particularly advantageous hydrogen-containing compound is ammonia borane (or a derivative thereof). More generally any amine-borane compound (or a derivative thereof may advantageously be employed).

In embodiments it is straightforward to recover the stored gas from the polymer sponge by changing the temperature to change the volume of the polymer sponge. In principle corresponding systems may be constructed using polymers which change volume with some other environmentally-controllable parameter, for example pH, irradiation or the like. Thus the aspects and embodiments of the invention described herein contemplate inventions which include such alternative approaches and the claims may be modified accordingly. Therefore, in the above described method of storing a gas according to the (first) aspect of the invention, more generally there is contemplated a method in which the polymer has a volume which reduces with any change in some externally controllable environmental parameter such as, but not necessarily limited to, temperature.

In preferred embodiments of the above described method the polymer sponge is recyclable, for example simply by washing any reaction by-products out of the polymer sponge after retrieving the gas.

In a related method, therefore the invention provides a method of recovering stored gas, the method comprising: providing a polymer sponge, wherein said polymer sponge comprises a plurality of catalytic nanoparticles, wherein said polymer sponge stores gas from a reaction catalysed by said nanoparticles, and wherein said polymer sponge comprises a thermally responsive polymer having a volume which reduces with a change in temperature; and changing a temperature of said polymer sponge to reduce a volume of said polymer sponge to recover said stored gas.

In principle the above described methods may also be adapted to storing a solid and/or liquid substance.

The invention further provides a gas storage device comprising a polymer sponge, wherein said polymer sponge comprises a plurality of catalytic nanoparticles; wherein said polymer sponge comprises a thermally responsive polymer having a volume which reduces with a change in temperature; and wherein said polymer sponge comprises a plurality of catalytic nanoparticles.

In a related aspect the invention provides a gas storage container comprising: a polymer sponge, wherein said polymer sponge comprises a plurality of catalytic nanoparticles; wherein a gas is held within said polymer sponge; and wherein said polymer sponge comprises a thermally responsive polymer having a volume which reduces with a change in temperature, said that said gas held within said polymer is extractable by changing a temperature of said polymer sponge, in embodiments in combination with a system or device to change a temperature of the polymer sponge.

In a still further aspect the invention provides a method of manufacturing a polymer sponge, wherein said polymer sponge comprises a plurality of catalytic nanoparticles, wherein said polymer sponge stores gas from a reaction catalysed by said nanoparticles, and wherein said polymer sponge comprises a thermally responsive polymer having a volume which reduces with a change in temperature; the method comprising polymerizing a monomer in the presence of said catalytic nanoparticles.

Optionally the threshold temperature may be adjusted by modifying the polymer (or monomer from which it is produced), for example by adding hydrophilic and/or hydrophobic groups.

Although we have described some particularly advantageous techniques which employ a polymer sponge, in principle similar reactions may be performed in solution. In this case it is preferable to stabilise the catalytic nanoparticles to reduce their tendency to agglomerate by employing stabilising molecules within the solution. It is particularly preferable to employ host-guest stabilisation of the (metal) nanoparticles in solution. In preferred embodiments this can be achieved by providing a guest molecule which has a charged part, which tends to attract the molecule to a nanoparticle, and a second, guest part, to interact with the host molecule (for example a bulky molecule, such as a macrocycle as described above, for example cucurbit[n]uril).

Thus in a further aspect the invention provides a method of producing gas, in particular hydrogen, comprising: providing a plurality of catalytic nanoparticles in a solution of reactants, catalysed by said nanoparticles to produce said gas; wherein said catalytic nanoparticles comprise complexes of a nanoparticle with a stabilising molecule, wherein said stabilising molecule stabilises a distribution of said nanoparticles in said solution; and wherein said stabilising molecule includes a region to facilitate a host-guest reaction for producing said gas.

Applications of this solution-based system may be extended still further: as described later the inventors have recognised and provided evidence that metal nanoparticles form in solution when adding a reducing agent to a metal salt in water or more general any polar solvent, for example a mixture of water and an alcohol. The inventors are the first to recognise and demonstrate that this occurs, and have thus understood that the result of such a process provides a method of making metal nanoparticles substantially lacking in ligands (unlike conventional fabrication processes), which in turn means that these metal nanoparticles are very useful as catalysts. Although metal nanoparticles bearing ligands have some value as catalysts much of their active surface is hidden, whereas with the new techniques that we describe much more of the nanoparticle surface is available for use.

Thus in a still further related aspect there is provided a method of catalysing a reaction using metal nanoparticles the method comprising: providing a solution of a metal precursor in a polar solvent; adding a reducing agent to said solution to form nanoparticles of said metal stabilised by unreduced, charged ions of said metal, and using said metal nanoparticles in a catalytic reaction.

This new approach provides a broad principle which is applicable to virtually any type of metal and metal precursor including, but not limited to, ruthenium, palladium, platinum, copper, iron, rhodium, gold, silver, cobalt or nickel.

Similarly the metal of precursor may be a metal salt or one or more of: $Na_2PdCl_4$, $PtCl_6$, $RhCl_3*H_2O$, $HAuCl_4$, $AgClO_3$, $CuC_2$, $CoCl_2$, $NiCl_2$ or $FeCl_2$, or a variant thereof.

A polar solvent has been found to be preferable because the hydrogen bonding appears to help stability. A mixture of ethanol and water, for example in around 1:1 w/w or v/v proportion, or some other proportion, has been found to be particularly effective. Nonetheless the technique we describe is robust and maybe used with a very wide range of different solvents and solvent mixtures.

In embodiments of the method, when the reducing agent is added the nanoparticles appear to form very quickly, for example over a time period of less than a minute up to a few minutes. Without wishing to be bound by theory the nanoparticle formation appears to be related to the presence of (unreduced) metal ions, which appear to form a type of sheath around the growing metal nanoparticles, which are thus stabilised. However it is important to recognise that the stabilisation of the metal nanoparticles is a dynamic process, and that an attempt to describe the mechanisms in static terms will inevitably only approximate the true situation.

In some preferred embodiments of the method one or more different types of stabilising molecule may be added to the solution, to further stabilise the nanoparticles. For example a relatively large or bulky molecule (greater than, say, 0.5 nm maximum dimension) may be added to the solution, and/or a stabilising molecule may be employed to construct a host-guest stabilisation system. In such a case the guest molecule may have a charged part or region so as to facilitate its (dynamic) attraction to a metal nanoparticle, and a second part or region which complexes with another molecule which may then, for example, provide some steric or geometric hindrance to nanoparticle agglomeration.

Thus in a further related aspect the invention provides a metal nanoparticle catalyst comprising a plurality of metal nanoparticles stabilised by stabilising molecules, wherein either: i) said stabilising molecules have a steric effect to stabilise said nanoparticles such that the nanoparticles are restructured from agglomerating with one another; or ii) wherein said stabilising molecule has a first, charged part to hold said stabilising molecules adjacent said nanoparticles, in particular wherein said stabilising molecule has a second guest part to interact with a host molecule, wherein said host molecule provides a steric effect to further stabilise said nanoparticles, such that the nanoparticles are restructured from agglomerating with one another.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 1:
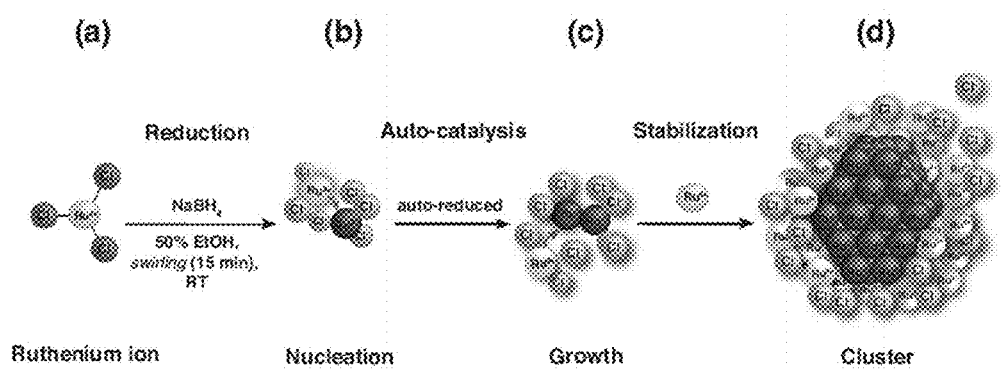
FIG. 1 shows the four steps in producing the metastable nanoparticles.

Hydrogen is among the leading candidates as an alternative energy source for the future. Whilst hydrogen gas is used in a variety of ways to generate energy, the most efficient process entails its conversion to electrical energy via fuel cell technologies. Fundamental technology exists for both the storage of hydrogen as well as its on-board production; however, improvement of current methods is crucial to achieve more efficient practical applications. Catalytic nanoparticles (NPs) have attracted a great deal of interest among both scientific and industrial communities owing to the unique properties derived from their characteristic large surface area-to-volume ratios. In order to achieve their small size during preparation, and to prevent subsequent particle coalescence due to the enhanced surface tension associated with small particle sizes, NPs are generally stabilized through the introduction of surfactants or surface-bound ligands and stabilizing agents. While the NPs must be covered with protective ligands for the purpose of stability and to allow them to be used in catalytic applications, the presence of the same protective ligands can also reduce substrate accessibility to the catalytic NP surface. These competing factors have presented the synthetic chemist with a dilemma, as a compromise between these competing issues must be sought. Embodiments of the present invention demonstrate a method of preparation of metastable catalytic metal nanoparticles which can be made from a variety of metals, including ruthenium, palladium, platinum, rhodium, gold, silver, copper, cobalt, nickel, and iron. This method not only offers versatility and simplicity in the preparation of organic ligand-free nanoparticles, but also allows for enhanced exposure of the catalytic surface of the NPs.

For example, consider the formation of the aforementioned nanoparticles using Ruthenium. Ruthenium complexes are among the most widely studied materials due to their catalytic performance. Some ruthenium complexes have recently been shown to be effective in the hydrolysis of ammonia borane and other metal hydrides. A number of different shapes, structures and compositions of RuNPs have also been investigated for their catalytic activity in a wide range of chemical transformations. As the size of NPs has a marked effect on the overall catalytic activity, their formation is of great consequence and is controlled by an aggregation process during reduction of the metal ions. In principle the particle size can be determined by influencing the relative rates of nucleation and cluster growth. Traditionally, in order to achieve such stable aggregates on the nanometer scale, the formation process, has been carried out in the presence of stabilizing ligands. Particle collisions by Brownian motion give rise to substantial agglomeration, if repulsive interactions or stabilizing ligands are not present. According to Turkevich and co-workers, there are three reaction stages in forming metal NPs: (i) an initial nucleation step, followed by (ii) aggregation, and finally (iii) growth.

For example, FIG. 1 illustrates the formation of metastable RuNPs: a) Ruthenium ions in solution; b) nucleation, forming initial seeds upon introducing $NaBH_4$; c) growth of seed dimensions, which occur when further ruthenium ions are introduced to the formed nuclei, eventually leading to the final stable state; d) metastable cluster, when remaining ruthenium ions are no longer reduced.

Host-Guest Stabilization System

Figure 2:
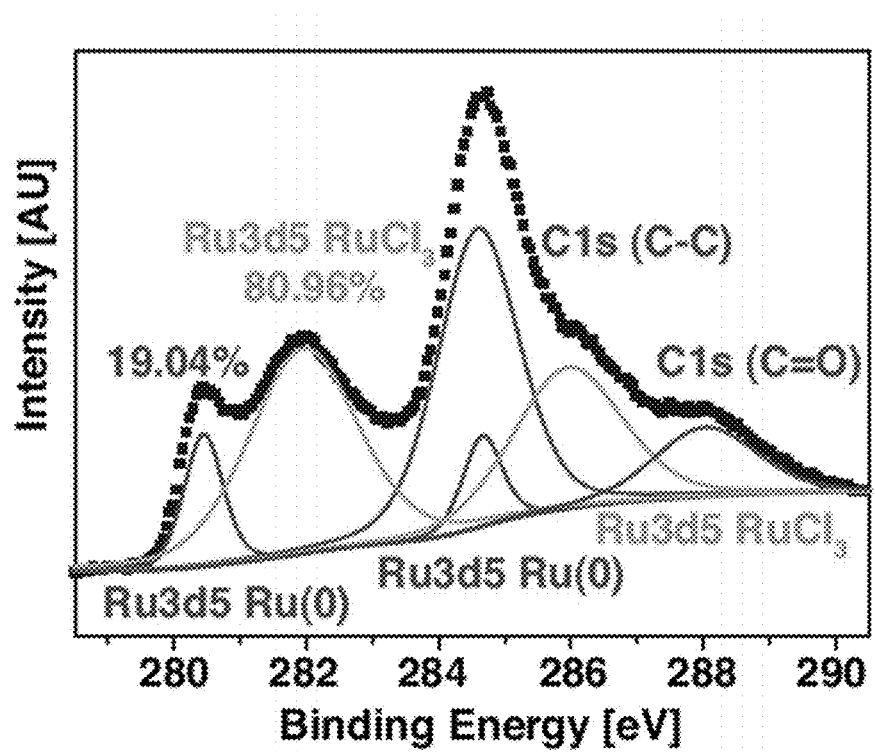
FIG. 2 shows the XPS spectra collected on metastable ruthenium nanoparticles.

The preparation of 'metastable' NPs can readily address the challenges ligands and additives introduce to catalytic nanoparticles when synthesised. The catalytically active NPs are further stabilised in a dynamic fashion by exploiting a versatile host-guest complex based on the macrocycle cucurbit[n]uril and a positively charged guest in solution, as illustrated in FIG. 2. The stability of the NPs complex is improved using this supramolecular approach, thus, allowing for a multiple use system in a catalytic reaction in solution.

Figure 3:
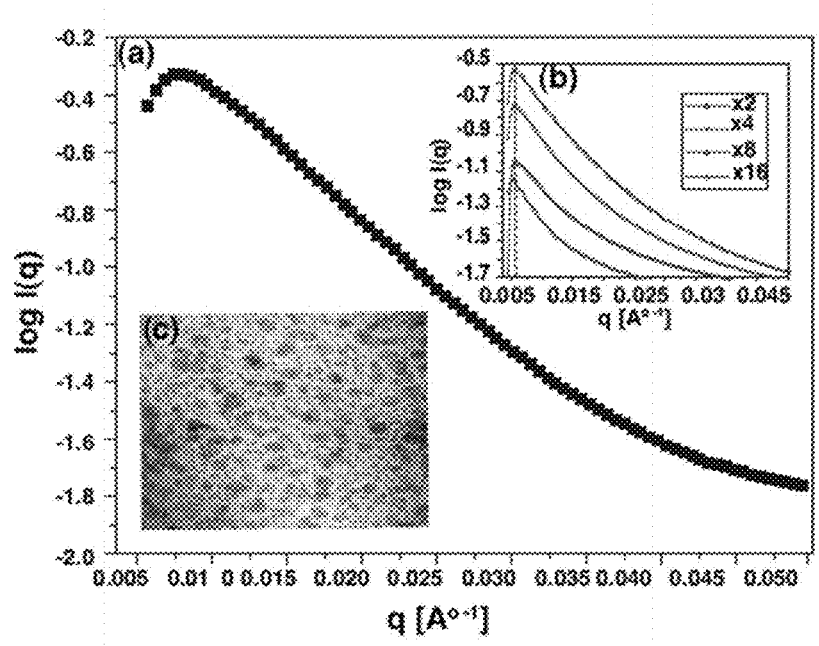
FIG. 3 shows the SAXS pattern of a metastable ruthenium nanoparticles in solution.

Additionally, FIG. 3 illustrates a process of nanoparticles stabilization by embedding the metastable catalytic nanoparticles described above in a solid matrix as well as stabilization of nanoparticles in solution used for the storage of gas, namely hydrogen. The solid support, can be utilised to promote in situ different catalytic transformations (such as c-c coupling, Suzuki, hydrogen transfer, oxidations etc.) and capture and release other gases (such as CO, $CO_2$, $N_2$ etc.) in a controllable manner by external temperature stimuli.

Synthesis Methods

System 1: Synthesis of Metastable Metal Nanoparticles (MNPs) Up to 5 nm

The synthesis of the metal nanoparticle will now be described, using Ruthenium as an example metal, but noting that the aforementioned metals could also be used. A solution of 1:1 (v/v) aqueous ethanol is added of a (30 mM) stock solution of $RuCl_3*H_2O$ or any other metal complex respectively ($Na_2PdCl_4/PtCl_6/RhCl_3*H_2O/HAuCl_4/AgClO_3/CuCl_2/CoCl_2/NiCl_2$ or $FeCl_2$) is then added to form a solution of 0.5 mM. The solution is sonicated for 1 min and 1 molar ratio of (0.1M) $NaBH_4$ of 1:1 (v/v) aqueous ethanol is immediately added under swirling for 15 min using benchtop incubator at 300 rpm at room temperature. The color of the solution should immediately change. The solution is then left to age for 24 h. The method could be applied for lower concentrations down to 0.1 mM for getting larger clusters and up to 2.5 mM for smaller clusters). Water only may be used a solvent system for metastable nanoparticles formation, however, a 1:1 (v/v) aqueous ethanol solvent system is found to be the most stable solvent mixture.

System 2: Supramolecular Dynamic Stabilization of Metastable MNPs in Solution by CB Molecules The nanoparticles can also be stabilized in solution. 1-adamantylamine (1 eq.) as a guest can be added to a CB[n] solution and heated to 50° C. under sonication for 15 min then is added to the MNPs (any of the metastable MNP solutions mentioned in system 1 described above) under vigorous swirling for 1 hour at room temperature. The color of the black-dark solution should become brighter, indicating a rapid CB[n] distribution in solution. The solution is then swirled using a bench-top incubator. This type of stabilization can be achieved using many other positively charged guests which can form a strongly bound host-guest complex, using the same molar ratio and under the same conditions.

System 3: Immobilization of CB[n]-MNPs Assemblies on a Thermoresponsive Polymeric Support Finally, the nanoparticles can be stabilized in a solid polymer matrix, forming a sponge-like material. The solid supported MNPs are prepared by dissolving N-isopropylacrylamide (NIPAm), N,N-methylenebisacrylamide (MBA; 0.086 molar ratio to NIPAm, (3-Acrylamido-propyl) trimethylammonium chloride (AMPTMA; 75 wt % in water; 0.013 molar ratio to NIPAm) and 4,4'-Azobis 4-cyanovaleric acid (ACPA; 0.020 molar ratio to NIPAm) in a Ruthenium nanoparticle solution (RuNP:CB[n]; $1.6 \times 10^{-4}$ molar ratio to NIPAm, 0.5 mM) prepared in a 1:1 (v/v) mixture of ethanol and water. This solution is then degassed with bubbling nitrogen for 20 min. This mixture is then added dropwise into a degassed solution of toluene (0.090 molar ratio to NIPAm), Span 80 (0.116 molar ratio to NIPAm) and dodecane ($8.6 \times 10^{-6}$ molar ratio to NIPAm) in a three-neck flask fitted with a mechanical stirrer. The nitrogen inlet and outlet is then removed and the flask heated to 70° C. while stirring at 360 rpm for 4 h. After this time, the particles are collected by decanting of the supernatant, washed with acetone and water and dried in a vacuum oven (60° C., 0 mbar, 4 h). The non-temperature responsive materials were prepared in an equivalent fashion using Acrylamide in place of NIPAm. Synthesis could be made for other MNPs than RuNPs as mentioned in system 1 procedure for concentrations from 0.1 mM.

The stabilized nanoparticles can then be reacted with a metal hydride, such as ammonia borane, to produce hydrogen gas, which is thought to be stored in the pores area of the polymeric matrix. On slight heating, catalytically generated and stored hydrogen gas from metal hydride compounds will be released.

Figure 4:
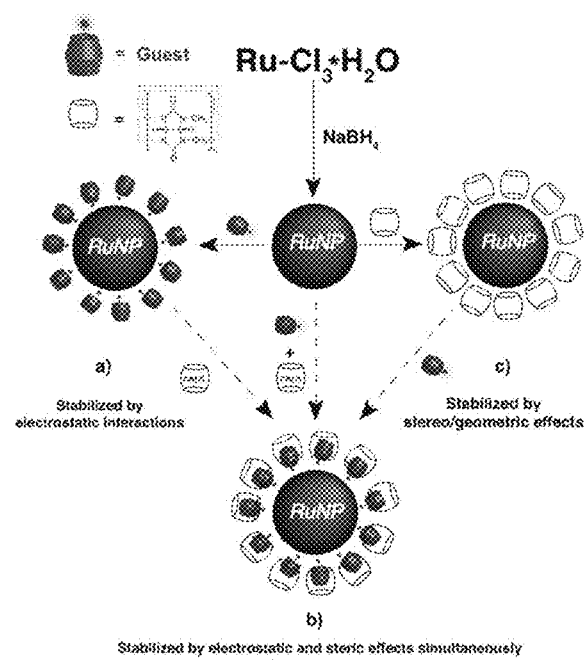
FIG. 4 shows the Host-Guest stabilization of the metal nanoparticles in solution.
Figure 5:
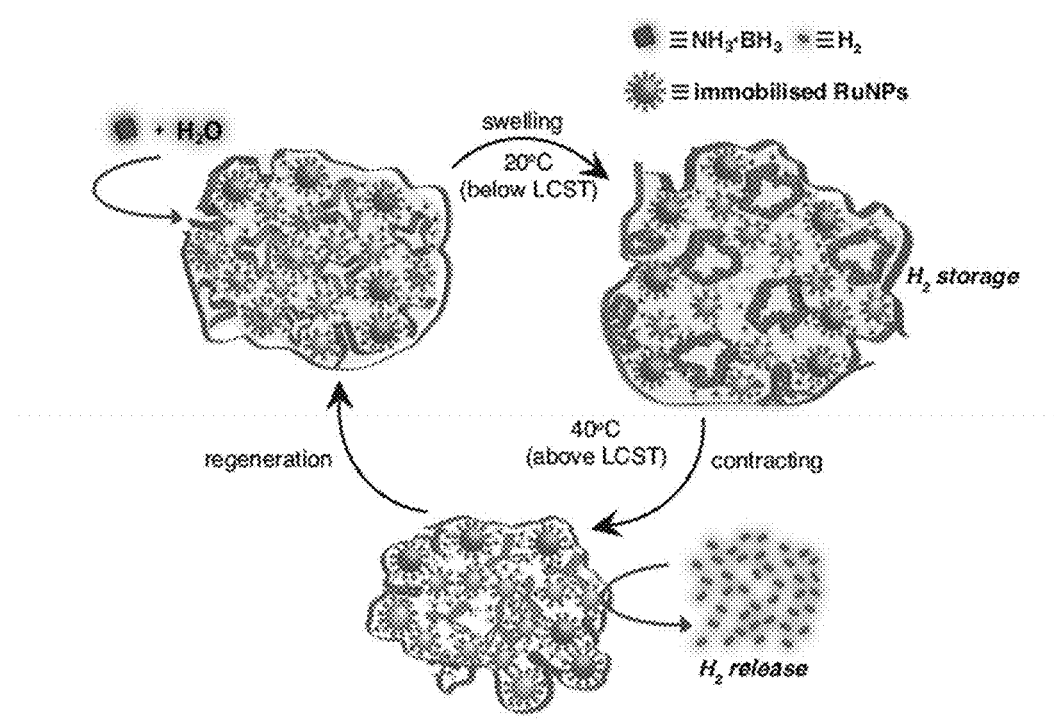
FIG. 5 shows the embedded metal nanoparticles in thermoresponsive "sponge-like" solid support.
Figure 6:
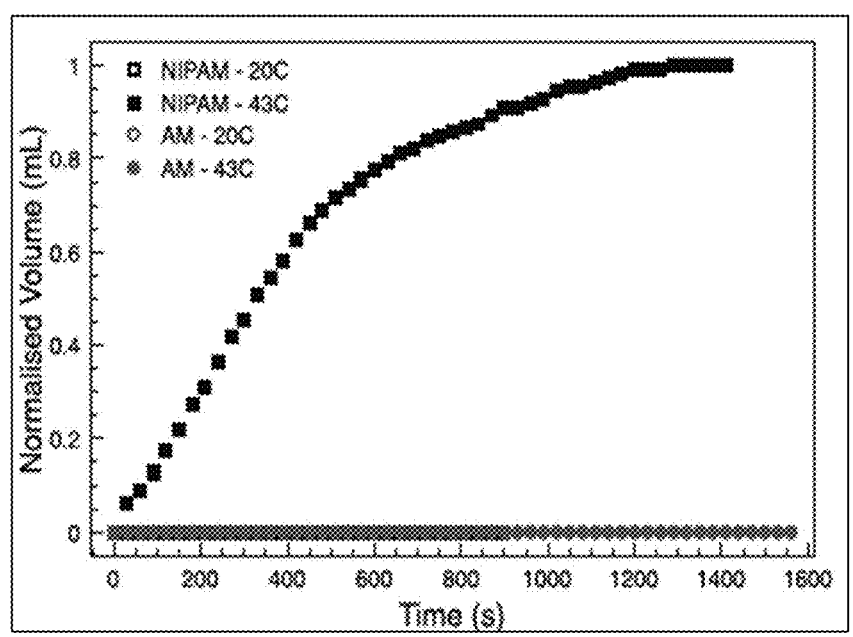
FIG. 6 shows thermoresponsive role of polymer as a function of hydrogen gas release.
Figure 7:
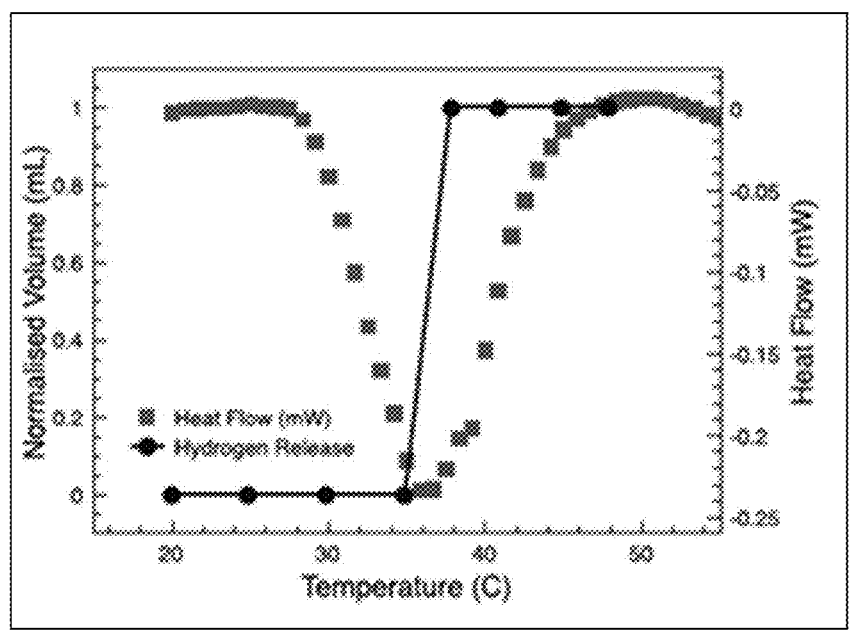
FIG. 7: shows DSC profile overlap with $H_2$ release point.
Figure 8:
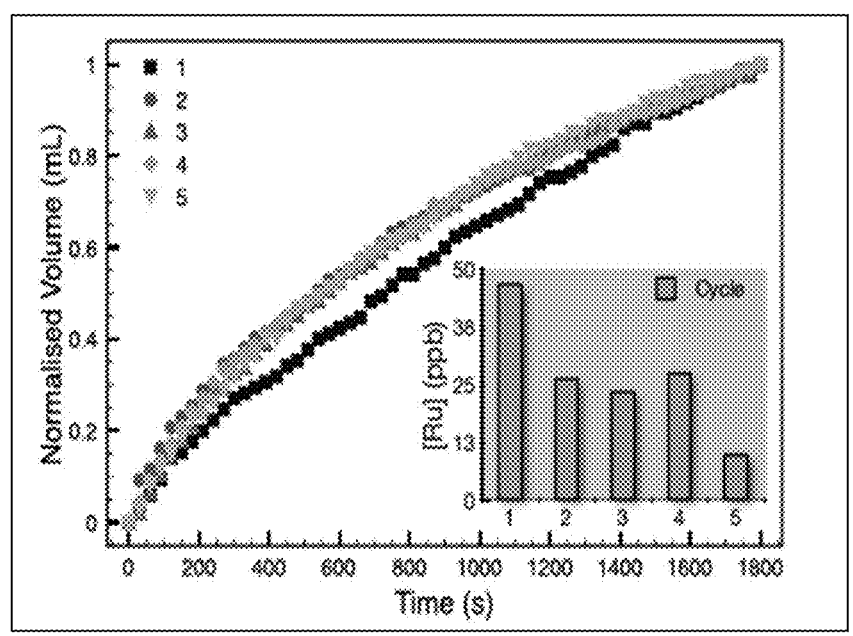
FIG. 8 shows recyclability of the material.
Figure 9:
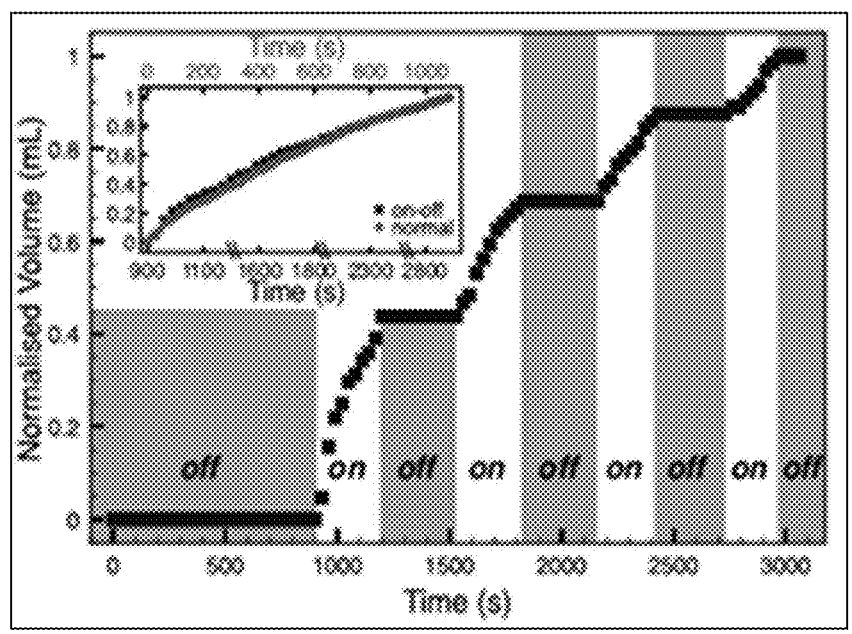
FIG. 9 shows on-off release by temperature control.
Figure 10:
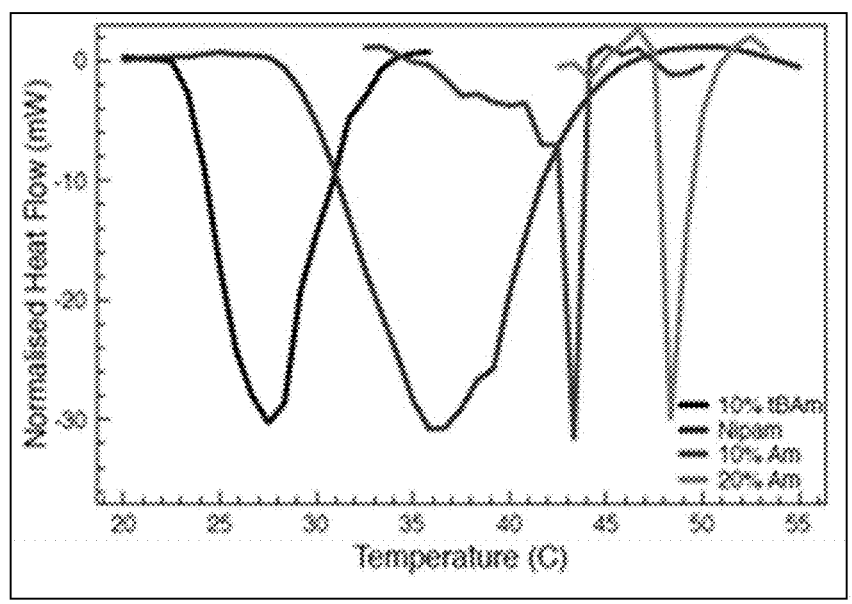
FIG. 10 shows LCST modulation with different functional groups.

Thermoresponsive catalytic production of hydrogen gas is achieved as shown in FIG. 4a. RuNP-polymer catalytic composites produce and store $H_2$ gas below the lower critical solution temperature (LCST) of the NIPAM-based thermo-responsive polymer matrix (20° C.), whereas heating above the LCST (43° C.) allows for matrix collapse and $H_2$ gas release. When the material does not display an LCST, as in acrylamide-based (AM) materials, no $H_2$ gas is released with temperature. As shown in FIG. 4b, LCST of the NIPAM-based material is clearly evident using differential scanning calorimetry and provides a trigger for the release of stored $H_2$ gas. In addition, this material is reusable; a recyclability plot is shown in FIG. 4c; the catalytic activity of these composite materials is retained after several cycles as the catalytically active RuNPs embedded in the thermo-responsive matrix are highly stabilized (inset). Inductively coupled plasma mass spectrometry results demonstrate that little to no Ru is lost after each catalytic cycle. Moreover, the release of $H_2$ gas is controllable with a temperature trigger whereby 'on' and 'off' correspond to environmental temperatures above and below the LCST of the composite material, respectively, as shown in FIG. 4d.

A facile variability of the LCST of the material is demonstrated in FIG. 4e by alteration of the relative hydrophobicity of the monomer loading through addition of either a hydrophobic comonomer t-butylacrylamide (tBAm) or a hydrophilic comonomer acrylamide (Am). The temperature at which the $H_2$ gas can be released is, therefore, tunable across a broad range. All samples contain an equivalent molar loading of acrylamide monomers and AMPTMA (0.013 molar ratio to Am monomer), MBA (0.086 molar ratio to Am monomer) and ACPA (0.02 molar ratio to Am monomer).

Materials:

N-Isopropylacrylamide (NIPAm) was purchased from Aldrich and recrystallized twice from hexane. 4,4'-Azobis (4-cyanopentanoic acid) (ACPA) was purchased from Aldrich and was recrystallized from methanol. All materials were purchased from Aldrich and used as received.

CONCLUSION

RuNPs are stabilized without protective organic ligands or additional supports while simultaneously exhibiting a high catalytic activity. Embodiments of the present invention demonstrate a simple yet efficient method to prepare metastable RuNPs in a 1:1 (v/v) water:ethanol mixture. The preparation process was concentration dependant on the $RuCl_3*H_2O$ precursor with respect to control over the NP size. Despite the lack of a conventional organic or inorganic stabilizing ligands present on the NP surface, metastable RuNPs were shown to be stable for many months likely on account of surrounding $Ru^{3+}$ ions, the presence of which was confirmed by XPS. Moreover, a consistent interparticle distance between the NPs was readily observed by SAXS measurements; this is attributed to the repulsion forces arising from these surrounding ions. Thus, the highly charged NP surfaces appear to gain long-term stability and control over size through charge-charge repulsion as opposed to direct ligand attachment. Additionally, the metastable RuNPs exhibit an fcc structure and were shown to be a promising catalytically active material for production of $H_2$ through the hydrolysis of ammonia-borane in water at room temperature. The activation energy of 27.5 $KJ*mol^{-1}$ for the catalytic hydrolysis was found to be remarkably low and resulted in a turnover number of 218 per minute, rendering the metastable RuNPs as an extremely promising candidate for the production of hydrogen gas under mild conditions for practical applications.

The metastable NPs embedded in thermoresponsive polymer forms a sponge-like Ru-polymer composites which can produce, store and release $H_2$ gas in a controlled manner. The RuNPs-polymer composites can produce and store 3 equiv of $H_2$ gas per $NH_3BH_3$ below a phase transition temperature of (42° C.) and upon heating to above that temperature, release the gas. Despite the slow kinetics achieved in the course of this study compared to traditional non-thermoresponsive supported NPs for catalytic $H_2$ production, the low regeneration temperature in this work (42° C.) can be further lowered or raised upon tuning the LSCT.

Thus embodiments of the invention demonstrate a simple approach for the preparation of thermoresponsive and porous polymer-ruthenium nanoparticle composite materials that catalytically produce and store hydrogen gas, and the inherent thermoresponsiveness allows for "on-demand" release of the stored gas. The catalytically active ruthenium nanoparticles are embedded into the polymer in a dynamic fashion by exploiting a versatile host-guest system based on the macrocycle cucurbit[n]uril. The materials demonstrate consistent behavior over many cycles and the catalytic activity and release temperature are easily modulated by the formulation.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of storing hydrogen gas, comprising:
    providing a polymer sponge, wherein said polymer sponge comprises a plurality of catalytic nanoparticles;
    providing a solution of reactants, catalysed by said nanoparticles to produce said gas;
    absorbing said solution into said polymer sponge such that said reactants react within said polymer sponge to produce said gas;
    wherein said gas is held within said polymer sponge; and
    wherein said polymer sponge comprises a thermally responsive polymer having a volume which reduces with a change in temperature, such that said gas held within said polymer is extractable by changing a temperature of said polymer sponge.

2. A method as claimed in claim 1 wherein said catalytic nanoparticles comprise complexes of a nanoparticle with a stabilising molecule, wherein said stabilising molecule interacts with said polymer and said nanoparticle to restrict agglomeration of said nanoparticles and stabilise a distribution of said nanoparticles during manufacture of said polymer.

3. A method as claimed in claim 2 wherein said stabilising molecule provides a steric effect to further stabilise said nanoparticles, such that the nanoparticles are restricted from agglomerating with one another.

4. A method as claimed in claim 3 wherein said stabilising molecule comprises cucurbit[n]uril.

5. A method as claimed in claim 1 wherein said nanoparticles comprise metal nanoparticles.

6. A method as claimed in claim 5 wherein said metal nanoparticles are ruthenium nanoparticles.

7. A method as claimed in claim 1 wherein said thermally responsive polymer has a volume which reduces above a threshold temperature to provide said gas.

8. A method as claimed in claim 1 comprising producing said polymer sponge by polymerising a monomer in the presence of said catalytic nanoparticles.

9. A method as claimed in claim 8 wherein said polymer comprises polyNIPAM.

10. A method as claimed in claim 1 wherein said reaction is an aqueous reaction, and wherein said solution is an aqueous solution.

11. A method as claimed in claim 1 wherein said reactants comprise a solution of metal hydride.

12. A method as claimed in claim 11 wherein said reaction comprises a reaction of a hydrogen-containing compound with water.

13. A method as claimed in claim 12 wherein said hydrogen-containing compound comprises an amine-borane compound or derivative thereof.

14. A method as claimed in claim 13 in which the amine-borane compound or derivative thereof is ammonia borane or a derivative thereof.

15. A method as claimed in claim 1 further comprising retrieving said gas from said polymer sponge, and optionally further comprising recycling said polymer sponge by washing a by-product of said reaction from said polymer sponge after retrieving said gas.

* * * * *